(12) United States Patent
Zhang et al.

(10) Patent No.: US 7,990,126 B1
(45) Date of Patent: *Aug. 2, 2011

(54) LOW POWER DC-DC CONVERTER WITH IMPROVED LOAD REGULATION

(75) Inventors: Jiancheng Zhang, Los Altos Hills, CA (US); Shaoan Dai, Cupertino, CA (US)

(73) Assignee: Marvell International, Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/507,322

(22) Filed: Jul. 22, 2009

Related U.S. Application Data (63) Continuation of application No. 11/491,021, filed on Jul. 20, 2006, now Pat. No. 7,576,527.

(51) Int. Cl.
*G05F 1/575* (2006.01)
(52) U.S. Cl. .................... 323/284; 323/285
(58) Field of Classification Search .......... 323/284, 323/282, 283, 285, 288, 222, 223, 286; 307/103
See application file for complete search history.

(56) References Cited

U.S. PATENT DOCUMENTS

| | | | |
|---|---|---|---|
| 5,770,940 A | 6/1998 | Goder | |
| 6,175,218 B1 | 1/2001 | Choi et al. | |
| 6,191,565 B1 * | 2/2001 | Lee et al. | 323/222 |
| 6,518,738 B1 | 2/2003 | Wang | |
| 6,801,026 B2 | 10/2004 | Schrom et al. | |
| 6,979,985 B2 | 12/2005 | Yoshida et al. | |
| 7,550,956 B2 * | 6/2009 | Martiny | 323/282 |
| 2004/0100241 A1 | 5/2004 | Abo | |
| 2005/0035746 A1 | 2/2005 | Bernacchia et al. | |
| 2005/0212498 A1 * | 9/2005 | Kubota et al. | 323/282 |
| 2010/0033145 A1 * | 2/2010 | Tseng et al. | 323/282 |

FOREIGN PATENT DOCUMENTS

WO  WO 2005078910 A1  8/2005

OTHER PUBLICATIONS

Maxim, "4MHz, 500mA Synchronous Step-Down DC-DC Converters in Thin SOT and TDFN," 19-2954, Rev.1; Jan. 2004.
Miftakhutdinov, "Synchronous buck regulator design using the TI TPS5211 high-frequency hysteretic controller," Analog Applications Journal, Analog and Mixed-Signal Products, Nov. 1999.

* cited by examiner

*Primary Examiner* — Harry Behm (57) ABSTRACT

A voltage converter includes, among other things, an amplifier, a voltage combiner, and a hysteretic comparator. The amplifier has a first input terminal which receives a first voltage representative of an output voltage of the voltage converter, a second input terminal which receives a first reference voltage, and an output terminal which generates a second voltage proportional to a difference between the first voltage and the first reference voltage. The voltage combiner combines the second voltage with a second reference voltage to generate a combined voltage. The comparator causes a third voltage to decrease if a feedback voltage defined by the third voltage is detected by the comparator as being greater than a first threshold voltage defined by the combined voltage, and further to cause the third voltage to increase if the feedback voltage is detected by the comparator as being less than the first threshold. The third voltage is applied to a first terminal of a load external to the voltage converter.

16 Claims, 10 Drawing Sheets

LOW POWER DC-DC CONVERTER WITH IMPROVED LOAD REGULATION

CROSS-REFERENCES TO RELATED APPLICATIONS

This application is a continuation application of commonly-assigned U.S. patent application Ser. No. 11/491,021, filed Jul. 20, 2006, the contents of which are hereby incorporated by reference in its entirety.

BACKGROUND OF THE INVENTION

The present invention relates generally to electronic circuits and, more particularly to conversion of voltages used in such circuits.

There is often a need to generate a lower DC output voltage from a higher DC input voltage in devices that contain integrated circuits (IC). Voltage converters that perform this function attempt to maintain a stable output voltage and to respond quickly to load transients. Uncontrolled variations in converter output voltage are generally undesirable.

Figure 1:
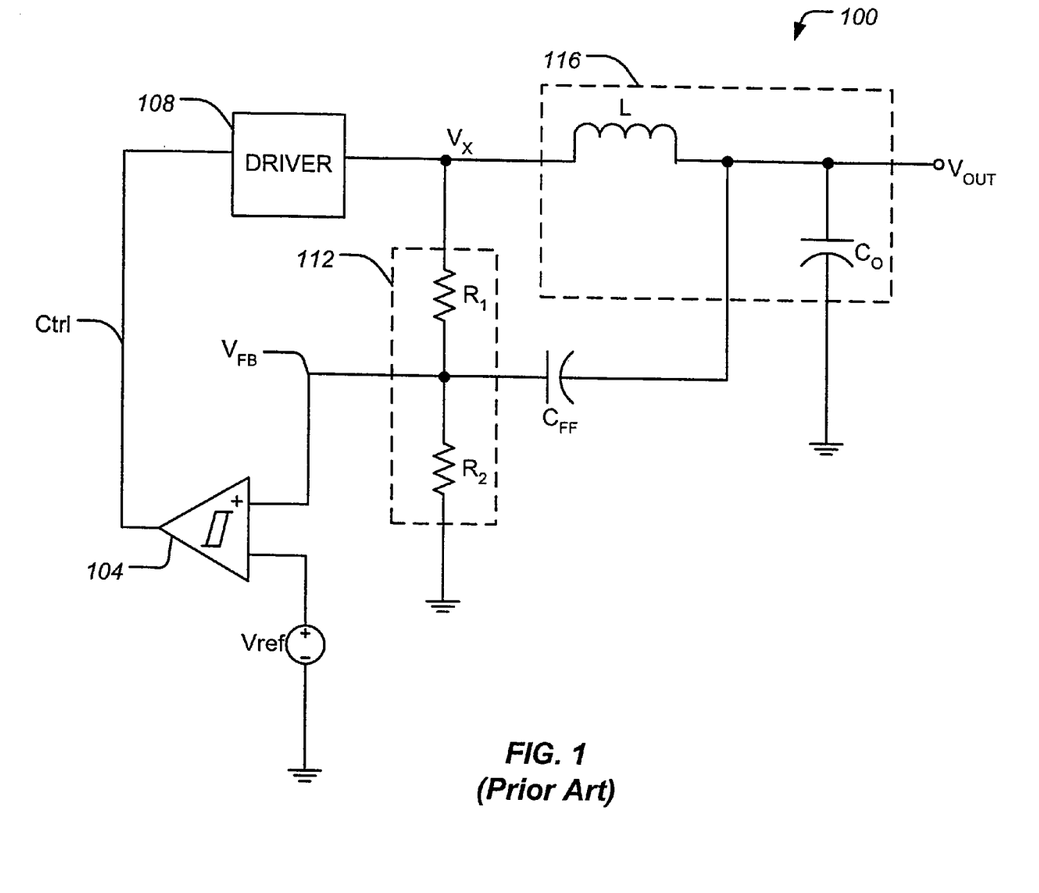
FIG. 1 is a simplified block diagram of a voltage converter, as known in the prior art.

One known circuit for converting voltages is shown in FIG. 1. Voltage converter 100 generates output voltage $V_{OUT}$ from input voltage $V_{IN}$. As shown, voltage converter 100 includes, in part, a comparator 104 with input hysteresis, a reference voltage generator $V_{REF}$, a driver 108, an LC filter 116, a voltage divider 112, and a capacitor $C_{FF}$. Hysteretic comparator 104 generates a control signal Ctrl by comparing reference voltage $V_{REF}$ to a feedback voltage $V_{FB}$. If feedback voltage $V_{FB}$ exceeds a hysteresis window defined by reference voltage $V_{REF}$, hysteretic comparator 104 assigns a first value to control signal Ctrl. If, on the other hand, feedback voltage $V_{FB}$ falls below the hysteresis window, hysteretic comparator 104 assigns a second value to control signal Ctrl.

Control signal Ctrl is operative to cause driver 108 to change voltage $V_X$. For example, driver 108 may cause voltage $V_X$ to alternate between input voltage $V_{IN}$ and ground. Changes in voltage $V_X$ are delivered by inductor L to the converter output $V_{OUT}$. Voltage divider 112 receives voltage $V_X$ and completes a loop by generating feedback voltage $V_{FB}$ and delivering it to an input terminal of hysteretic comparator 104. LC filter 116 is included to attenuate high-frequency noise components that may be present in converter output $V_{OUT}$, and feedback capacitor $C_{FF}$ is included to modify loop response characteristics.

Persons of ordinary skill in the art will recognize that a voltage drop $\Delta V$ is generated between $V_X$ and $V_{OUT}$ due to the resistance of inductor L. The relationship between converter output voltage $V_{OUT}$ and inductor voltage drop $\Delta V$ can be expressed as $V_{OUT} = \overline{V}_X - \Delta V$, where $\overline{V}_X$ is the average of $V_X$, and is related to $V_{REF}$ as $(1+R_1/R_2) \cdot V_{REF}$. Also, as will be clear to those of skill in the relevant art, inductor voltage drop $\Delta V$ is related to inductor current $I_L$ and its resistance $R_L$ as $(\Delta V = I_L \cdot R_L)$. Thus, as shown, voltage drop $\Delta V$ directly affects output voltage $V_{OUT}$ and is not controlled or otherwise regulated by voltage converter 100. It is therefore an object of the present invention to reduce the effect of this voltage drop on the converter output voltage and to correspondingly improve the ability of the voltage converter to control its output under changing load conditions.

BRIEF SUMMARY OF THE INVENTION

A voltage converter, in accordance with one embodiment of the present invention, includes, in part, an amplifier and a comparator. The amplifier is responsive to a first reference voltage and to a first feedback voltage representative of an output voltage of the voltage converter. The comparator is responsive to an output voltage of the amplifier and a second feedback voltage. The comparator generates an output voltage applied to a control line of the voltage converter.

In one embodiment, the voltage converter further includes a voltage combiner that combines the output voltage of the amplifier with a second reference voltage. In another embodiment, the voltage combiner combines the output voltage of the amplifier with the second feedback voltage. The voltage combiner supplies the combined voltage to the comparator. The second reference voltage may be substantially equal to the first reference voltage. A driver generates the second feedback voltage in response to the output voltage of the comparator.

In some embodiments, the voltage converter further includes a first resistive voltage divider in communication with the output of the driver. An inductive load is also in communication with the output of the driver. A second resistive voltage divider may also be in communication with the inductive load.

In some embodiments, the comparator is a hysteretic voltage comparator. The voltage combiner is optionally a subtractor circuit responsive to the second reference voltage. The inductive load is an inductor in some embodiments.

In accordance with another embodiment of the present invention, a method of converting a voltage includes amplifying a difference between a first reference voltage and a first feedback voltage representative of an output voltage to generate an amplified difference voltage; comparing a voltage defined by a second feedback voltage to a first threshold voltage defined by either a second reference voltage or the amplified difference voltage thereby to generate a control voltage; decreasing the control voltage if the voltage defined by the second feedback voltage is detected as being greater than the first threshold value; increasing the control voltage if the voltage defined by the second feedback voltage is detected as being smaller than the first threshold; and driving an external load in response to the control voltage.

In one embodiment, the method of converting the voltage further includes combining the second feedback voltage with the amplified difference voltage; and comparing the second reference voltage with the combined voltage to generate the control voltage. In another embodiment, the method of converting the voltage further includes combining the second reference voltage with the amplified difference voltage; and comparing the second feedback voltage with the combined voltage to generate the control signal.

In some embodiments, the second reference voltage is substantially equal to the first reference voltage. In other embodiments, the method of converting the voltage further includes buffering the control voltage; and applying the buffered control voltage to the external load. The buffered control voltage may be divided to generate the second feedback voltage. The external load is responsive to the buffered control voltage.

In some embodiments, the external load is an inductive load and the method further includes dividing an output voltage of the inductive load to generate the first feedback signal. In some embodiments, a hysteretic comparator performs the comparing step. In some embodiments, the method further includes subtracting the second feedback voltage from the amplified difference voltage. In yet other embodiments, the method further includes subtracting the second reference voltage from the amplified difference voltage.

In accordance with another embodiment of the present invention, a voltage converter includes means for amplifying a difference between a first reference voltage and a first feedback voltage representative of an output voltage to generate an amplified difference voltage; means for comparing a voltage defined by a second feedback voltage to a first threshold voltage defined by either a second reference voltage or the amplified difference voltage thereby to generate a control voltage; means for decreasing the control voltage if the voltage defined by the second feedback voltage is detected as being greater than the first threshold value; means for increasing the control voltage if the voltage defined by the second feedback voltage is detected as being smaller than the first threshold; and means for driving an external load in response to the control voltage.

In one embodiment, the voltage converter further includes means for combining the second feedback voltage with the amplified difference voltage; and means for comparing the second reference voltage with the combined voltage to generate the control voltage. In another embodiment, the voltage converter further includes means for combining the second reference voltage with the amplified difference voltage; and means for comparing the second feedback voltage with the combined voltage to generate the control signal.

In some embodiments, the second reference voltage is substantially equal to the first reference voltage. In other embodiments, the voltage converter further includes means for buffering the control voltage; and means for applying the buffered control voltage to the external load. The buffered control voltage may be divided to generate the second feedback voltage. The external load is responsive to the buffered control voltage.

In some embodiments, the external load is an inductive load and the voltage converter further includes means for dividing an output voltage of the inductive load to generate the first feedback signal. In some embodiments, the comparing means includes a hysteretic comparator. In some embodiments, the voltage converter further includes means for subtracting the second feedback voltage from the amplified difference voltage. In yet other embodiments, the voltage converter further includes means for subtracting the second reference voltage from the amplified difference voltage.

DETAILED DESCRIPTION OF THE INVENTION

A voltage converter in accordance with one embodiment of the present invention includes, in part, an amplifier, a voltage combiner, a hysteretic comparator, and a driver. The amplifier generates an error voltage signal representative of a voltage drop across an inductor disposed in the voltage converter. The voltage combiner combines the error voltage signal with a first reference voltage to generate a combined voltage signal. The hysteretic comparator compares the combined voltage signal to a feedback voltage signal and generates a control signal. The driver receives the control signal and causes a corresponding increase or decrease in the driver output voltage. Because the voltage drop across the resistive load of the inductor is reduced by a factor corresponding to the gain of the amplifier, uncontrolled variations in the converter output voltage are avoided.

Figure 2A:
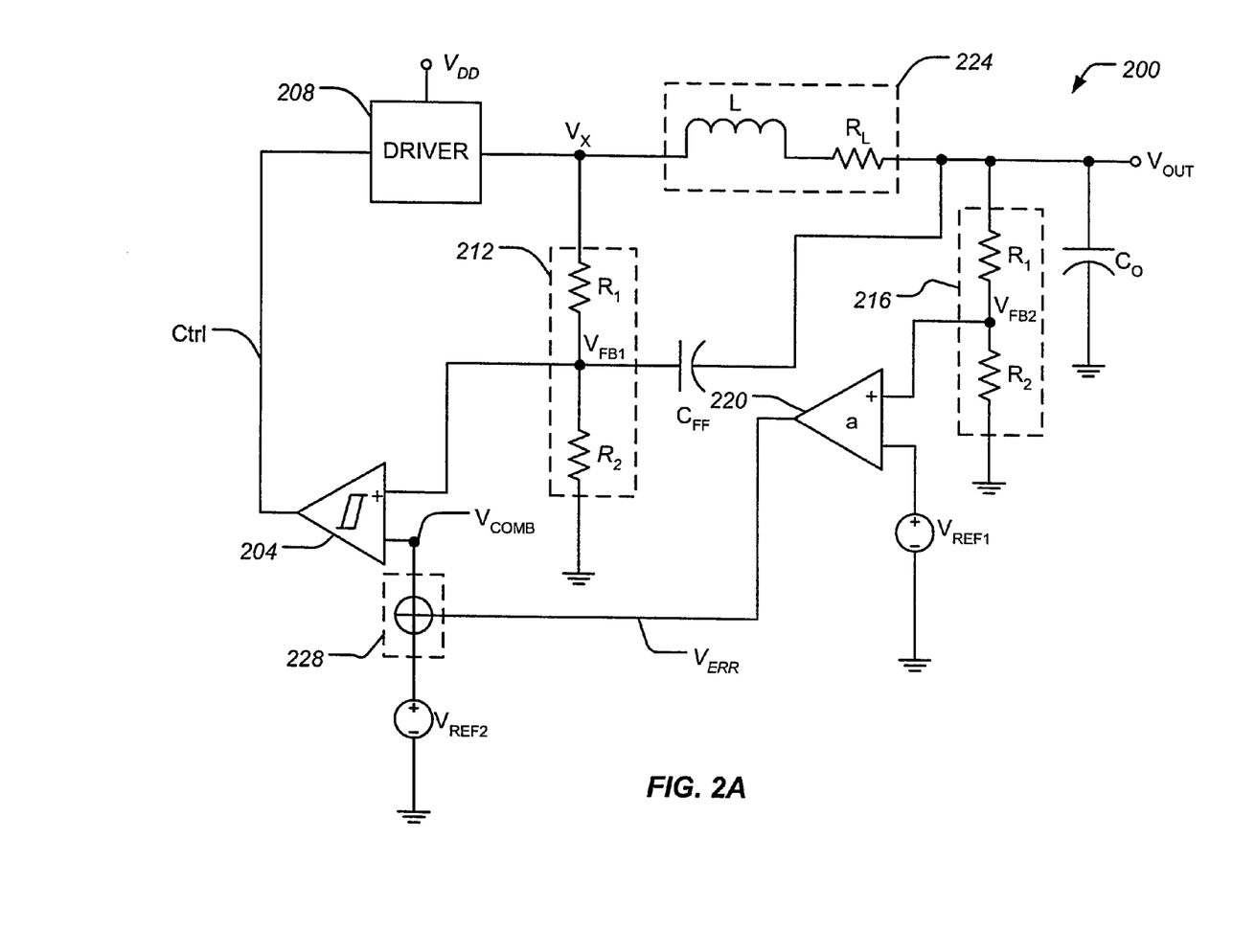
FIG. 2A is a simplified block diagram of a voltage converter according to one embodiment of the present invention.

FIG. 2A shows a simplified block diagram of a voltage converter 200 according to an embodiment of the present invention. Voltage converter 200 converts input voltage $V_{IN}$ into output voltage $V_{OUT}$. As shown, first voltage divider 212 divides driver 208 output voltage $V_X$ to generate a first feedback voltage $V_{FB1}$. Second voltage divider 216 divides converter output voltage $V_{OUT}$ to generate a second feedback voltage $V_{FB2}$. Voltage dividers 212, 216 are disposed on opposite sides of an inductor 224 and are shown with fixed resistor values R1, R2 for dividing each voltage according to a predetermined ratio. Inductor 224 is shown as including inductive component L and resistive component $R_L$. Resistive component $R_L$ generates a voltage drop ΔV when current flows through inductor 224. $R_L$ may vary depending upon, among other factors, (i) the manufacturing process used to create inductor 224 and (ii) operating conditions such as temperature. Due to voltage drop ΔV, converter output voltage $V_{OUT}$ is not equal to driver 208 output voltage $V_X$. Capacitor $C_{FF}$ is included to modify loop response characteristics and, in some embodiments, to control the switching frequency of the driver circuit.

Amplifier 220 receives second feedback voltage $V_{FB2}$ and a first reference voltage $V_{REF1}$ at its input terminals. Amplifier 220 compares second feedback voltage $V_{FB2}$ to first reference voltage $V_{REF1}$ and generates an error voltage signal $V_{ERR}$ at its output terminal having a value that is proportional to the difference between second feedback voltage $V_{FB2}$ and first reference voltage $V_{REF1}$. In some embodiments, amplifier 220 may include an operational amplifier which receives second feedback voltage $V_{FB2}$ at its non-inverting terminal and receives first reference voltage $V_{REF1}$ at its inverting terminal. In such embodiments, error voltage $V_{ERR}$ may be defined by $V_{ERR}=a*(V_{FB2}-V_{REF1})$ where a represents the gain of the operational amplifier. In an exemplary embodiment, the value of a ranges, for example, between 1 and 10.

Error voltage $V_{ERR}$ is delivered to voltage combiner 228 which, in response, generates a combined voltage $V_{COMB}$ representing the combination of first voltage $V_1$ and a second reference voltage $V_{REF2}$. In some exemplary embodiments of the voltage converter, second reference $V_{REF2}$ is equal to the first reference voltage $V_{REF1}$. Combined voltage $V_{COMB}$ is supplied to an input terminal of hysteretic comparator 204. In some embodiments, combined voltage $V_{COMB}$; represents a difference between second reference voltage $V_{REF2}$ and error voltage $V_{ERR}$ ($V_{COMB}=V_{REF2}-V_{ERR}$). In such embodiments, voltage combiner 228 may include an adder/subtractor circuit.

Hysteretic comparator 204 receives first feedback voltage $V_{FB1}$ and compares it to combined voltage $V_{COMB}$ to generate control signal Ctrl. If first feedback voltage $V_{FB1}$ exceeds a threshold value defined by combined voltage $V_{COMB}$, hysteretic comparator 204 causes control signal Ctrl to have a first value. Similarly, if first feedback voltage $V_{FB1}$ is below a threshold value defined by combined voltage $V_{COMB}$, hysteretic comparator 204 causes control signal Ctrl to have a second value. Control signal Ctrl is delivered to driver 208. Driver 208 receives control signal Ctrl and generates driver output voltage $V_X$ in response.

If second feedback voltage $V_{FB2}$ exceeds first reference voltage $V_{REF1}$, error voltage $V_{ERR}$ generated by amplifier 220 will be positive with respect to ground. In the embodiment in which voltage combiner 288 is an adder/subtractor, combined voltage $V_{COMB}$ will be less than second reference voltage $V_{REF2}$ when error voltage $V_{ERR}$ is positive. If the relatively smaller value of combined voltage $V_{COMB}$ falls below the threshold value, hysteretic comparator 204 will assign the first value to control signal Ctrl. If driver 208 receives the first value of control signal Ctrl, it will lower the voltage at $V_X$. This, in turn, will lower converter output voltage $V_{OUT}$. On the other hand, if second feedback voltage $V_{FB2}$ is less than first reference voltage $V_{REF1}$, error voltage $V_{ERR}$ will be negative with respect to ground. In this case, combined voltage $V_{COMB}$ will be greater than the second reference voltage $V_{REF2}$. If first feedback voltage $V_{FB1}$ falls below a threshold defined by the relatively larger value of combined voltage $V_{COMB}$, hysteretic comparator 204 will assign the second value to control signal Ctrl. If the second value is assigned to Ctrl, driver 208 will increase the voltage at $V_X$ and, therefore, $V_{OUT}$ will also increase.

If $V_{REF1}=V_{REF2}=V_{REF}$ and if R1 is assumed to be much smaller than R2 ($R_1 \ll R_2$), it can be shown that the $V_{OUT} \cong V_{REF} - \Delta V/(1+a)$. Thus, voltage converter 200 reduces the effect of inductor voltage drop $\Delta V$ by a factor of (1+a) enabling significantly tighter control of the converter output voltage $V_{OUT}$.

Figure 2B:
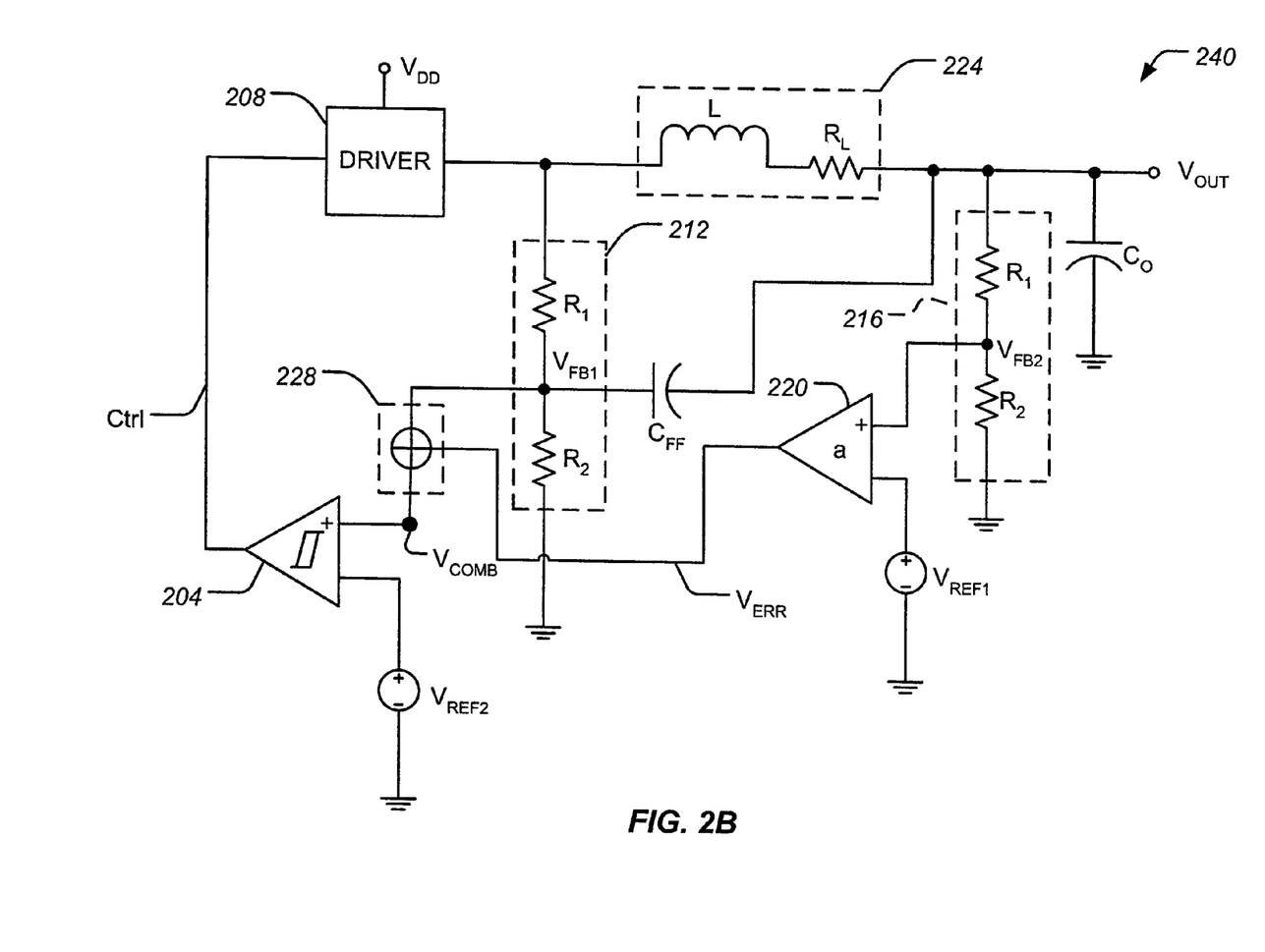
FIG. 2B is a simplified block diagram of a voltage converter according to another embodiment of the present invention.

FIG. 2B shows a simplified block diagram of a voltage converter 240 according to a further embodiment of the present invention. Voltage combiner 228 is disposed to receive first feedback signal $V_{FB1}$ and error voltage $V_{ERR}$ and to generate combined voltage $V_{COMB}$. Combined voltage $V_{COMB}$ is delivered to an input terminal of hysteretic comparator 204. In some embodiments, voltage combiner 228 generates combined voltage $V_{COMB}$ by adding error voltage $V_{ERR}$ to first feedback voltage $V_{FB1}$ ($V_{COMB}=V_{FB1}+V_{ERR}$). Thus, if $V_{FB2}$ exceeds $V_{REF1}$, error voltage $V_{ERR}$ will be positive and $V_{COMB}$ will be greater than $V_{FB1}$. If the relatively larger combined voltage $V_{COMB}$ exceeds a threshold value defined by second reference voltage $V_{REF2}$, hysteretic comparator 204 will respond by assigning the first value to control signal Ctrl. This, in turn, will cause driver 208 to reduce $V_X$. Converter output voltage $V_{OUT}$ will also be reduced. Similarly, if $V_{FB2}$ is less than $V_{REF1}$, error voltage $V_{ERR}$ will be negative and combined voltage $V_{COMB}$ will be less than $V_{FB1}$. If the relatively smaller combined voltage $V_{COMB}$ falls below the threshold value, hysteretic comparator 204 will assign the second value to control signal Ctrl causing driver 208 to increase $V_X$. In this case, $V_{OUT}$ will also be increased.

Figure 3A:
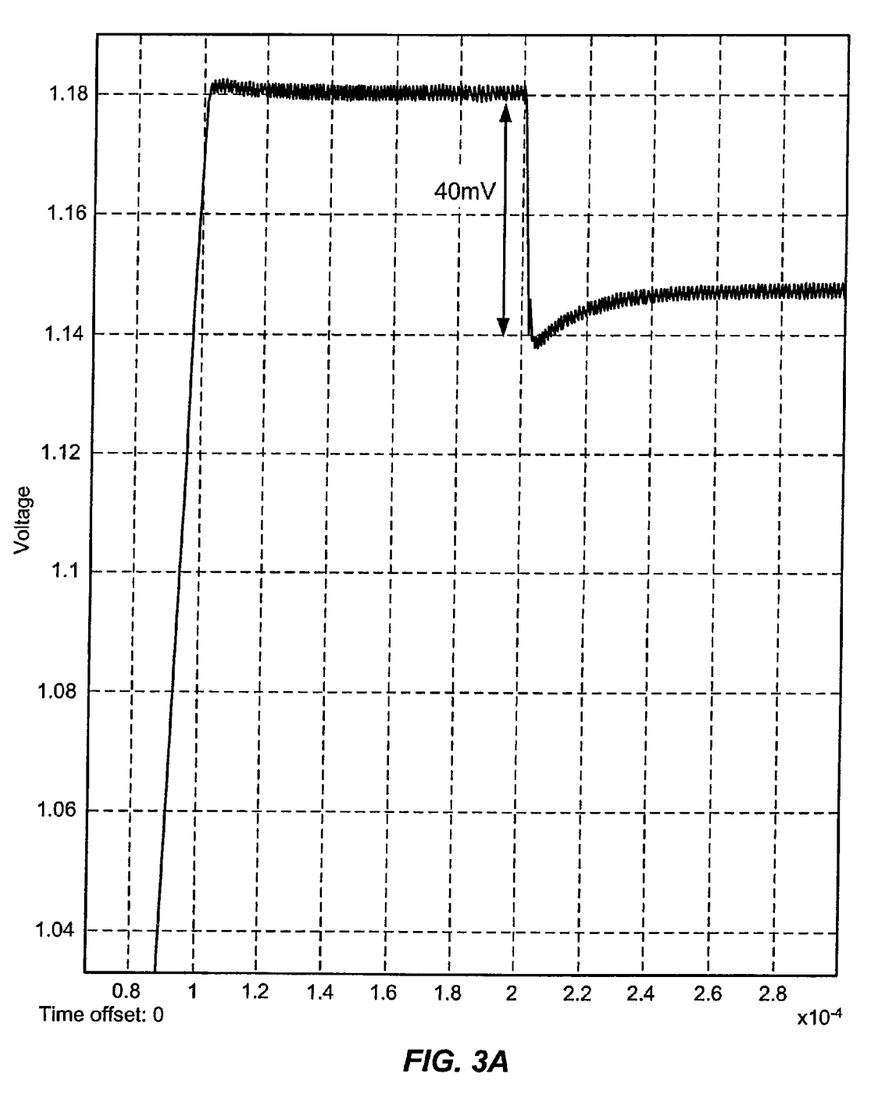
FIGS. 3A, 3B and 3C are exemplary waveform diagrams showing the effect of changes in load current on converter output voltage according to exemplary embodiments of the present invention.
Figure 3B:
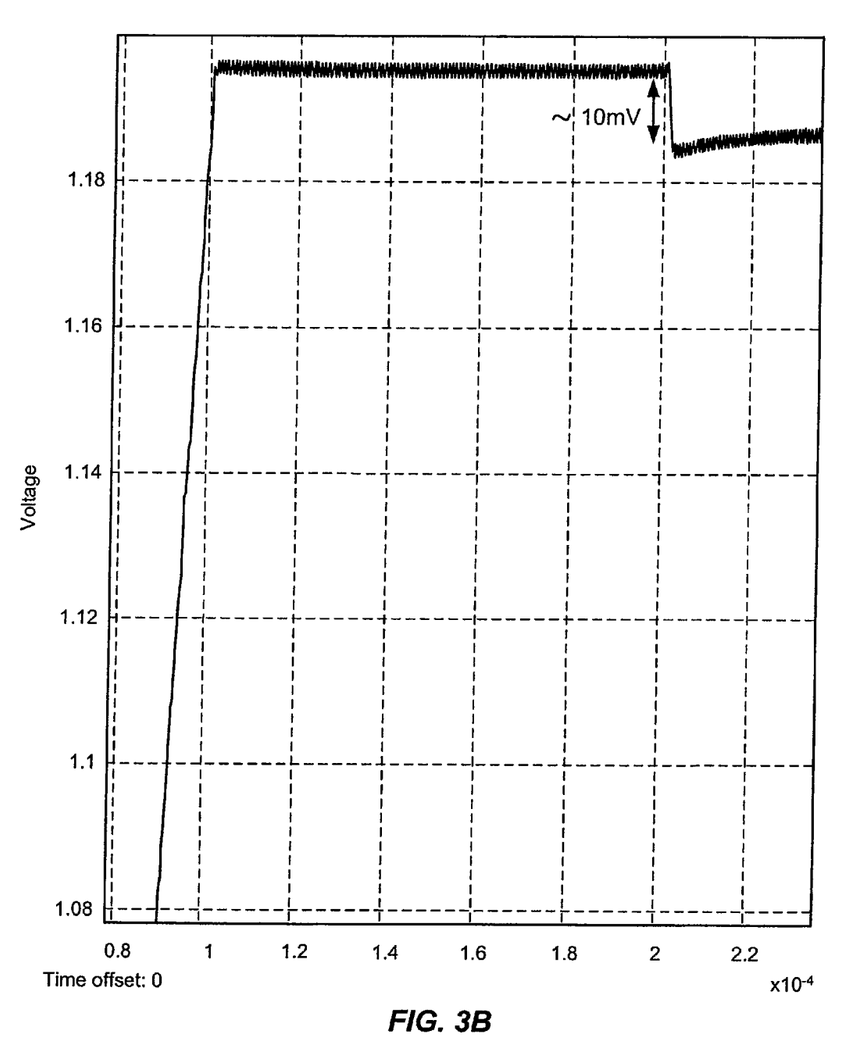
Figure 3C:
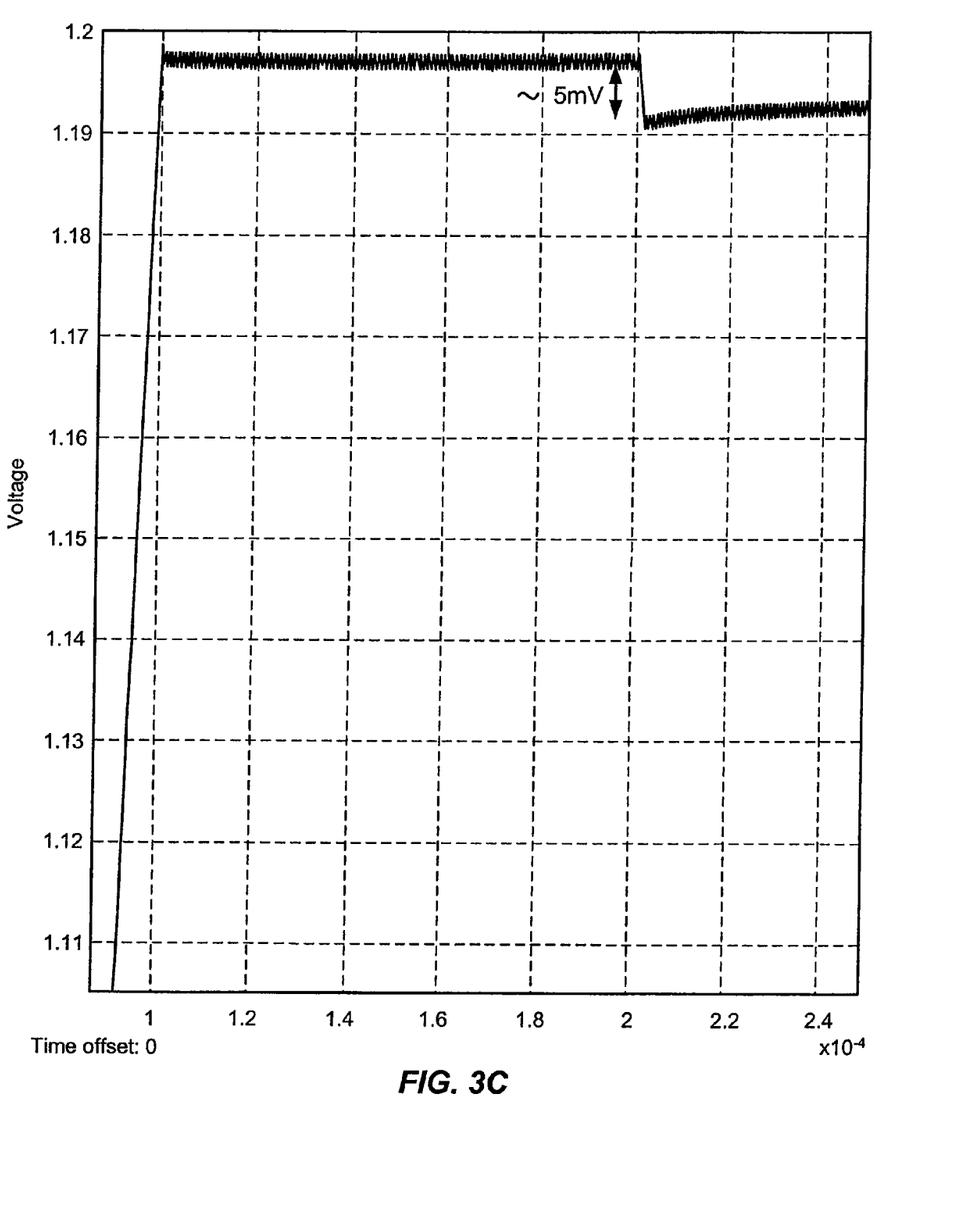

FIGS. 3A, 3B, and 3C are exemplary simulation timing diagrams showing a relationship between converter output voltage and load current according to embodiments of the present invention. In each diagram, time is represented on the horizontal axis and converter output voltage is represented on the vertical axis. All diagrams are based upon exemplary reference voltages of 1.2V ($V_{REF1}=V_{REF2}=1.2V$) and all assume that a load is introduces at $T_1=2s$ causing a 500 mA current step. FIG. 3A shows the effect on the converter output voltage when the gain of amplifier 220 is set to approximately 0.5. It can be seen that converter output voltage drops by nearly 40 mV when the load is introduced and slowly settles to a steady-state value less than 1.15V. Prior to introduction of the load, converter output voltage is approximately 1.18V. The 20 mV difference from the reference voltage is caused by a voltage drop across inductor (L).

FIG. 3B shows converter output voltage when the amplifier 220 gain is increased to approximately 5. In this case, converter output voltage drops by 10 mV when the load switching occurs. In FIG. 3C, amplifier gain is further increased to approximately 10 and converter output voltage drops by 5 mV in response to switching of the load.

Figure 4A:
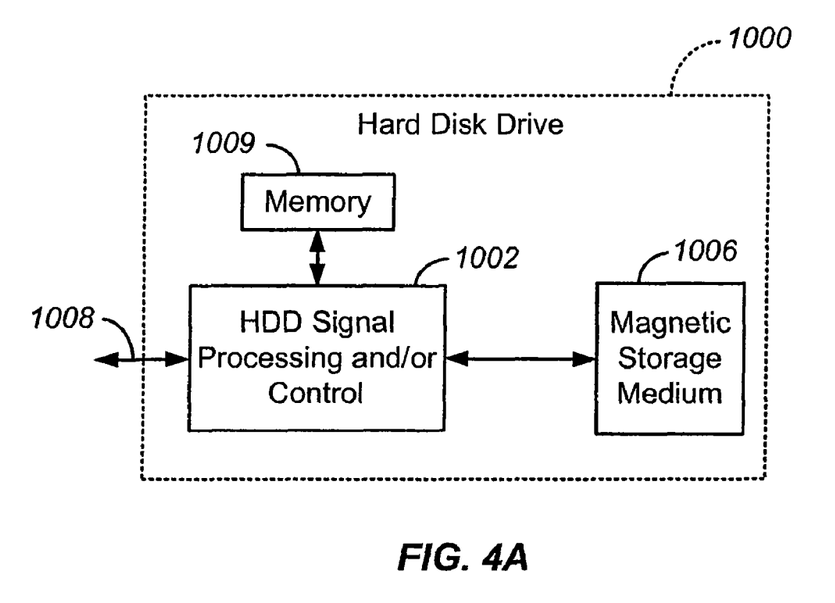
FIGS. 4A-4H show various devices in which the present invention may be embodied.

Referring now to FIGS. 4A-4H, various exemplary implementations of the present invention are shown. Referring to FIG. 4A, the present invention may be embodied in a hard disk drive 1000. The present invention may implement either or both signal processing and/or control circuits, which are generally identified in FIG. 4A at 1002. In some implementations, signal processing and/or control circuit 1002 and/or other circuits (not shown) in HDD 1000 may process data, perform coding and/or encryption, perform calculations, and/or format data that is output to and/or received from a magnetic storage medium 1006.

HDD 1000 may communicate with a host device (not shown) such as a computer, mobile computing devices such as personal digital assistants, cellular phones, media or MP3 players and the like, and/or other devices via one or more wired or, wireless communication links 1008. HDD 1000 may be connected to memory 1009, such as random access memory (RAM), a low latency nonvolatile memory such as flash memory, read only memory (ROM) and/or other suitable electronic data storage.

Figure 4B:
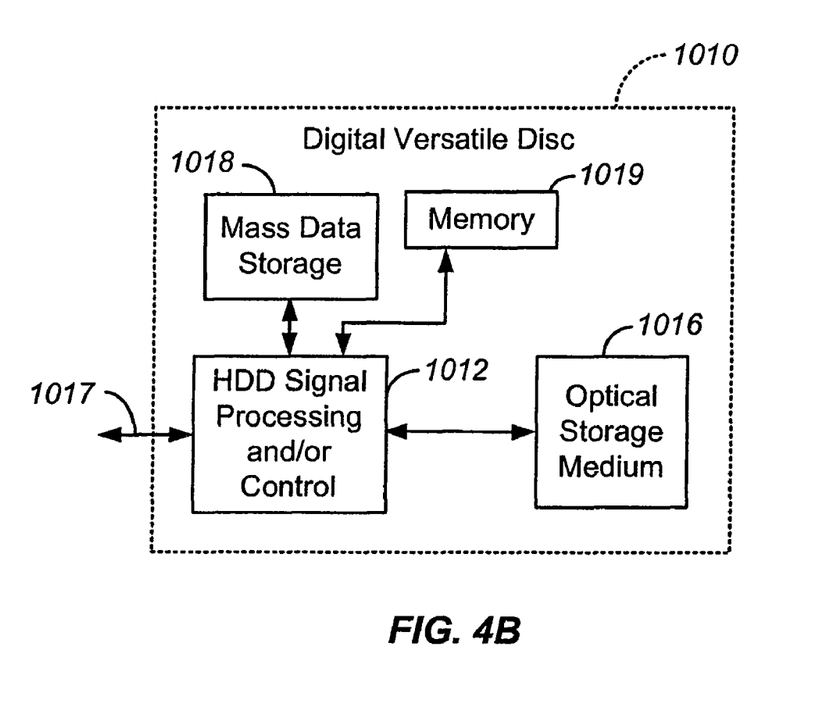

Referring now to FIG. 4B, the present invention may be embodied in a digital versatile disc (DVD) drive 1010. The present invention may implement either or both signal processing and/or control circuits, which are generally identified in FIG. 4B at 1012, and/or mass data storage 1018 of DVD drive 1010. Signal processing and/or control circuit 1012 and/or other circuits (not shown) in DVD 1010 may process data, perform coding and/or encryption, perform calculations, and/or format data that is read from and/or data written to an optical storage medium 1016. In some implementations, signal processing and/or control circuit 1012 and/or other circuits (not shown) in DVD 1010 can also perform other functions such as encoding and/or decoding and/or any other signal processing functions associated with a DVD drive.

DVD drive 1010 may communicate with an output device (not shown) such as a computer, television or other device via one or more wired or wireless communication links 1017. DVD 1010 may communicate with mass data storage 1018 that stores data in a nonvolatile manner. Mass data storage 1018 may include a hard disk drive (HDD) such as that shown in FIG. 4A. The HDD may be a mini HDD that includes one or more platters having a diameter that is smaller than approximately 1.8". DVD 1010 may be connected to memory 1019, such as RAM, ROM, low latency nonvolatile memory such as flash memory, and/or other suitable electronic data storage.

Figure 4C:
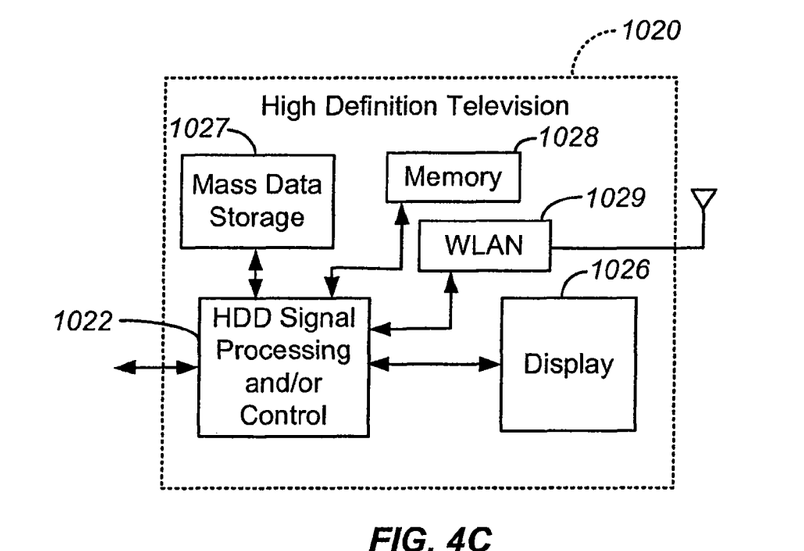

Referring now to FIG. 4C, the present invention may be embodied in a high definition television (HDTV) 1020. The present invention may implement either or both signal processing and/or control circuits, which are generally identified in FIG. 4C at 1022, a WLAN interface and/or mass data storage of the HDTV 1020. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with mass data storage 1027 that stores data in a nonvolatile manner such as optical and/or magnetic storage devices. At least one HDD may have the configuration shown in FIG. 4A and/or at least one DVD may have the configuration shown in FIG. 4B. The HDD may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029.

Figure 4D:
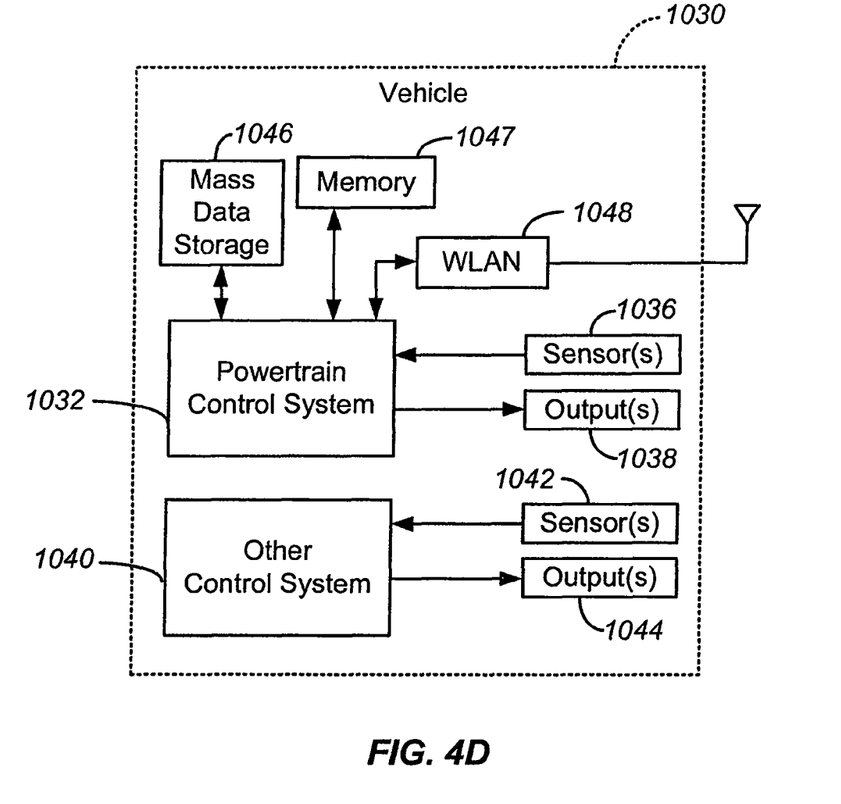

Referring now to FIG. 4D, the present invention implements a control system of a vehicle 1030, a WLAN interface and/or mass data storage of the vehicle control system. In some implementations, the present invention implements a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1040 of vehicle 1030. Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1032 may communicate with mass data storage 1046 that stores data in a nonvolatile manner. Mass data storage 1046 may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown).

Figure 4E:
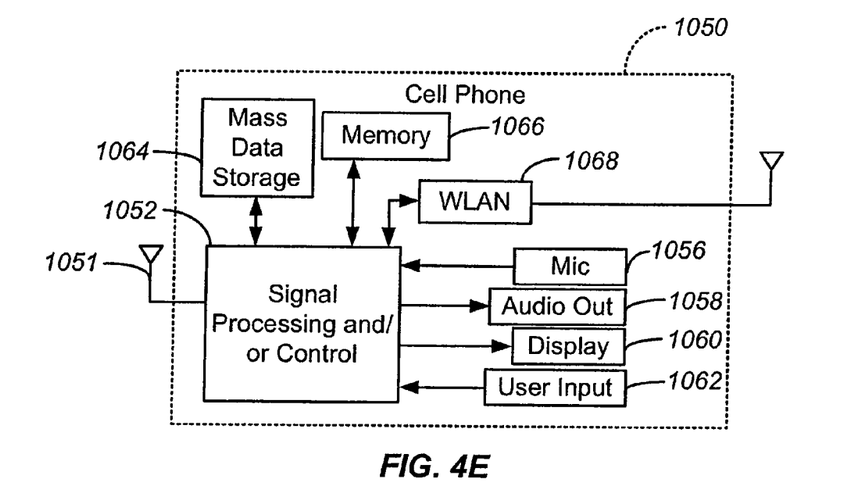

Referring now to FIG. 4E, the present invention may be embodied in a cellular phone 1050 that may include a cellular antenna 1051. The present invention may implement either or both signal processing and/or control circuits, which are generally identified in FIG. 4E at 1052, a WLAN interface and/or mass data storage of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068.

Figure 4F:
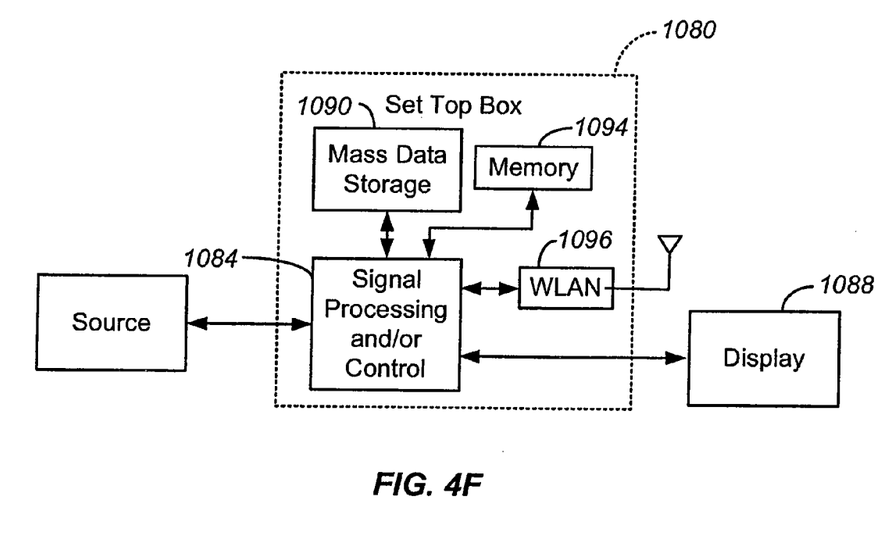

Referring now to FIG. 4F, the present invention may be embodied in a set top box 1080. The present invention may implement either or both signal processing and/or control circuits, which are generally identified in FIG. 4F at 1084, a WLAN interface and/or mass data storage of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner. Mass data storage 1090 may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096.

Figure 4G:
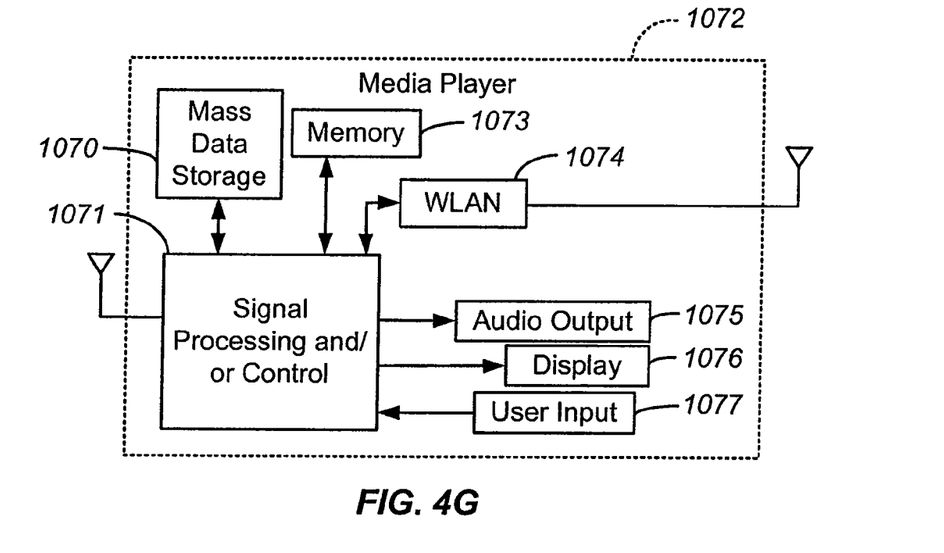

Referring now to FIG. 4G, the present invention may be embodied in a media player 1072. The present invention may implement either or both signal processing and/or control circuits, which are generally identified in FIG. 4G at 1071, a WLAN interface and/or mass data storage of the media player 1072. In some implementations, media player 1072 includes a display 1076 and/or a user input 1077 such as a keypad, touchpad and the like. In some implementations, media player 1072 may employ a graphical user interface (GUI) that typically employs menus, drop down menus, icons and/or a point-and-click interface via display 1076 and/or user input 1077. Media player 1072 further includes an audio output 1075 such as a speaker and/or audio output jack. Signal processing and/or control circuits 1071 and/or other circuits (not shown) of media player 1072 may process data, perform coding and/or encryption, perform calculations, format data and/or perform any other media player function.

Media player 1072 may communicate with mass data storage 1070 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". Media player 1072 may be connected to memory 1073 such as RAM, ROM, low latency nonvolatile memory such as flash memory and/or other suitable electronic data storage. Media player 1072 also may support connections with a WLAN via a WLAN network interface 1074.

Figure 4H:
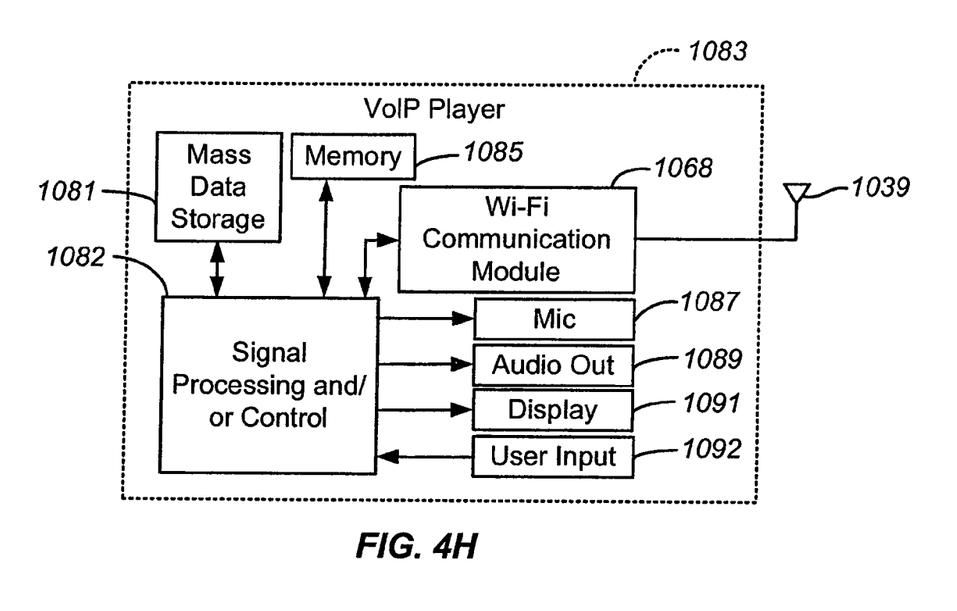

Referring to FIG. 4H, the present invention may be embodied in a Voice over Internet Protocol (VoIP) phone 1083 that may include an antenna 1039. The present invention may implement either or both signal processing and/or control circuits, which are generally identified in FIG. 4H at 1082, a wireless interface and/or mass data storage of the VoIP phone 1083. In some implementations, VoIP phone 1083 includes, in part, a microphone 1087, an audio output 1089 such as a speaker and/or audio output jack, a display monitor 1091, an input device 1092 such as a keypad, pointing device, voice actuation and/or other input devices, and a Wireless Fidelity (Wi-Fi) communication module 1086. Signal processing and/or control circuits 1082 and/or other circuits (not shown) in VoIP phone 1083 may process data, perform coding and/or encryption, perform calculations, format data and/or perform other VoIP phone functions.

VoIP phone 1083 may communicate with mass data storage 502 that stores data in a nonvolatile manner such as optical and/or magnetic storage devices, for example hard disk drives HDD and/or DVDs. At least one HDD may have the configuration shown in FIG. 4A and/or at least one DVD may have the configuration shown in FIG. 4B. The HDD may be a mini HDD that includes one or more platters having a diameter that is smaller than approximately 1.8". VoIP phone 1083 may be connected to memory 1085, which may be a RAM, ROM, low latency nonvolatile memory such as flash memory and/or other suitable electronic data storage. VoIP phone 1083 is configured to establish communications link with a VoIP network (not shown) via Wi-Fi communication module 1086. Still other implementations in addition to those described above are contemplated.

The above embodiments of the present invention are illustrative and not limitative. Various alternatives and equivalents are possible. For example, the load could be other than an inductor. The invention is not limited by the type of comparator, driver, filter, etc. used. In addition, the invention is not limited by the type of amplifier used to establish the voltage signal or by a particular implementation of the voltage combining circuit. The invention is not limited by the type of integrated circuit in which the present disclosure may be disposed. Nor is the invention limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A voltage converter comprising:
   an amplifier responsive to a first reference voltage and to a first divided voltage indicative of a voltage at a first end of an inductive load;
   a voltage combiner that generates a combined voltage based at least in part on an output voltage of the amplifier; and
   a comparator that receives the combined voltage, the comparator being responsive to at least the output voltage of the amplifier and a second divided voltage indicative of a voltage at a second end of the inductive load, the comparator generating a comparator output voltage used to control the voltage converter,
   wherein the voltage combiner generates the combined voltage based on the output voltage of the amplifier and a second reference voltage, the second reference voltage comprising a non-zero value, wherein the output voltage and the second reference voltage are inputs to the voltage combiner, and
   wherein the second reference voltage is substantially equal to the first reference voltage.

2. The voltage converter of claim 1 wherein the first divided voltage comprises a first fraction of the voltage at the first end of the inductive load and the second divided voltage comprises a second fraction of the voltage at the second end of the inductive load.

3. A voltage converter comprising:
   an amplifier responsive to a first reference voltage and to a first divided voltage indicative of a voltage at a first end of an inductive load;
   a voltage combiner that generates a combined voltage based at least in part on an output voltage of the amplifier;
   a comparator that receives the combined voltage, the comparator being responsive to at least the output voltage of the amplifier and a second divided voltage indicative of a voltage at a second end of the inductive load, the comparator generating a comparator output voltage used to control the voltage converter; and
   a driver to generate the second divided voltage in response to the comparator output voltage,
   wherein the voltage combiner generates the combined voltage based on the output voltage of the amplifier and the second divided voltage, wherein the output voltage and the second divided voltage are inputs to the voltage combiner.

4. The voltage converter of claim 3 further comprising a driver to generate the second divided voltage in response to the comparator output voltage.

5. The voltage converter of claim 3 wherein the first divided voltage comprises a first fraction of the voltage at the first end of the inductive load and the second divided voltage comprises a second fraction of the voltage at the second end of the inductive load.

6. A method of converting a voltage, the method comprising:
   amplifying a difference between a first reference voltage and a first divided voltage indicative of a voltage at a first end of an inductive load to thereby generate an amplified difference voltage;
   generating a combined voltage based at least in part on the amplified difference voltage that is supplied to a comparator, the comparator being responsive to at least the amplified difference voltage and a second divided voltage indicative of a voltage at a second end of the inductive load;
   generating a control voltage based on an output voltage generated by the comparator;
   driving an external load in response to the control voltage;
   generating the combined voltage based on the amplified difference voltage and the second divided voltage, wherein the amplified difference voltage and the second divided voltage are inputs to a voltage combiner; and
   comparing the combined voltage with a second reference voltage to generate the control voltage; and
   decreasing the control voltage if the combined voltage is detected as being greater than the second reference voltage and increasing the control voltage if the combined voltage is detected as being smaller than the second reference voltage.

7. The method of claim 6 further comprising:
   buffering the control voltage; and
   applying the buffered control voltage to the external load.

8. The method of claim 7 further comprising:
   dividing the buffered control voltage to generate the second divided voltage.

9. The method of claim 6 wherein the first divided voltage comprises a first fraction of the voltage at the first end of the inductive load and the second divided voltage comprises a second fraction of the voltage at the second end of the inductive load.

10. A method of converting a voltage, the method comprising:
- amplifying a difference between a first reference voltage and a first divided voltage indicative of a voltage at a first end of an inductive load to thereby generate an amplified difference voltage;
- generating a combined voltage based at least in part on the amplified difference voltage that is supplied to a comparator, the comparator being responsive to at least the amplified difference voltage and a second divided voltage indicative of a voltage at a second end of the inductive load;
- generating a control voltage based on an output voltage generated by the comparator;
- driving an external load in response to the control voltage;
- generating the combined voltage based on the amplified difference voltage and a second reference voltage wherein the amplified difference voltage and the second reference voltage are inputs to a voltage combiner, the second reference voltage comprising a non-zero value; and
- comparing the combined voltage with the second divided voltage to generate the control voltage;
- buffering the control voltage;
- applying the buffered control voltage to the external load; and
- dividing the buffered control voltage to generated the second divided voltage.

11. The method of claim 10 further comprising decreasing the control voltage if the combined voltage is detected as being greater than the second divided voltage and increasing the control voltage if the combined voltage is detected as being smaller than the second divided voltage.

12. A voltage converter comprising:
- an amplifier that generates an amplified voltage based on a first reference voltage and a first divided voltage indicative of a voltage at a first end of an inductive load;
- a voltage combiner that generates a combined voltage based at least in part on the amplified voltage of the amplifier and supplies the combined voltage to a comparator; and
- a driver that drives an external load based on an output of the comparator,
- wherein the comparator is responsive to at least the amplified voltage and a second divided voltage indicative of a voltage at a second end of the inductive load and wherein the voltage combiner generates the combined voltage based on the amplified voltage of the amplifier and a second reference voltage wherein the amplified voltage and the second reference voltage are inputs to the voltage combiner, the second reference voltage comprising a non-zero value, and
- wherein the second reference voltage is substantially equal to said first reference voltage.

13. The voltage converter of claim 12 wherein the first divided voltage comprises a first fraction of the voltage at the first end of the inductive load and the second divided voltage comprises a second fraction of the voltage at the second end of the inductive load.

14. The voltage converter of claim 12 wherein the driver generates the second divided voltage in response to the output of the comparator.

15. A voltage converter comprising:
- an amplifier that generates an amplified voltage based on a first reference voltage and a first divided voltage indicative of a voltage at a first end of an inductive load;
- a voltage combiner that generates a combined voltage based at least in part on the amplified voltage of the amplifier and supplies the combined voltage to a comparator; and
- a driver that drives an external load based on an output of the comparator,
- wherein the comparator is responsive to at least the amplified voltage and a second divided voltage indicative of a voltage at a second end of the inductive load and wherein the voltage combiner generates the combined voltage based on the amplified voltage of the amplifier and the second divided voltage, wherein the amplified voltage and the second divided voltage are inputs to the voltage combiner, and
- wherein the driver generates the second divided voltage in response to the output of the comparator.

16. The voltage converter of claim 15 wherein the first divided voltage comprises a first fraction of the voltage at the first end of the inductive load and the second divided voltage comprises a second fraction of the voltage at the second end of the inductive load.

* * * * *